(12) United States Patent
Riedrich

(10) Patent No.: US 9,115,783 B2
(45) Date of Patent: Aug. 25, 2015

(54) DEVICE FOR FASTENING AND CLAMPING STRAPS

(75) Inventor: Andreas Riedrich, Bruchmuehlbach (DE)

(73) Assignee: Andreas Riedrich, Bruchmuehlbach (DE)

( * ) Notice: Subject to any disclaimer, the term of this patent is extended or adjusted under 35 U.S.C. 154(b) by 2 days.

(21) Appl. No.: 13/513,264

(22) PCT Filed: Nov. 30, 2010

(86) PCT No.: PCT/DE2010/075146
§ 371 (c)(1),
(2), (4) Date: Jun. 28, 2012

(87) PCT Pub. No.: WO2011/066828
PCT Pub. Date: Jun. 9, 2011

(65) Prior Publication Data
US 2012/0279020 A1    Nov. 8, 2012

(30) Foreign Application Priority Data
Dec. 2, 2009    (DE) .......................... 10 2009 044 739

(51) Int. Cl.
*F16G 11/10*    (2006.01)
*F16G 3/16*    (2006.01)
*A44B 11/12*    (2006.01)

(52) U.S. Cl.
CPC . *F16G 3/16* (2013.01); *A44B 11/12* (2013.01); *Y10T 24/3938* (2015.01); *Y10T 24/3949* (2015.01); *Y10T 24/3953* (2015.01)

(58) Field of Classification Search
CPC ....... F16G 3/16; A44B 11/12; Y10T 24/3949; Y10T 24/3938
USPC ................................. 24/133, 134 N
See application file for complete search history.

(56) References Cited

U.S. PATENT DOCUMENTS 1,117,874 A * 11/1914 Main ........................... 24/134 N
1,430,783 A * 10/1922 Berger ........................ 24/136 R
(Continued)

FOREIGN PATENT DOCUMENTS

DE    1 773 606    9/1958
DE    12 33 124    1/1967
(Continued)

OTHER PUBLICATIONS

International Search Report of PCT/DE2010/075146, date of mailing May 2, 2011.
(Continued)

*Primary Examiner* — Robert J Sandy
*Assistant Examiner* — Louis Mercado
(74) *Attorney, Agent, or Firm* — Collard & Roe, P.C.

(57) ABSTRACT

In order to create a device for fastening and clamping straps that also permanently withstands high mechanical loads of the type that occur during the tensioning of slacklines, in particular longlines, at least one pair of pivoting levers are be provided, between which two mutually parallel clamping plates with flat clamping surfaces are hinged, the clamping surfaces being at least as wide as the strap and being provided with securing devices for securing the strap in the clamped state. The pivoting levers are fastened to a tensioning device, for example a chain hoist, on actuation of which the pivoting levers absorb the tension and transmit it to the clamping plates so that the clamping surfaces of the clamping plates are pressed together, thereby securely clamping the strap fitted between the clamping surfaces.

1 Claim, 4 Drawing Sheets

(56) References Cited

U.S. PATENT DOCUMENTS

| | | | | |
|---|---|---|---|---|
| 1,447,456 | A | * | 3/1923 | Wright .......................... 24/134 R |
| 1,460,276 | A | * | 6/1923 | Robertson .................... 24/132 R |
| 1,478,950 | A | * | 12/1923 | Gilliam ............................ 24/133 |
| 2,377,953 | A | * | 6/1945 | Matton .......................... 451/557 |
| 2,431,819 | A | * | 12/1947 | Meyer .......................... 24/132 R |
| 2,548,800 | A | * | 4/1951 | Judson ........................... 104/216 |
| 3,824,653 | A | * | 7/1974 | Sholler .................... 24/134 KB |
| 3,886,631 | A | * | 6/1975 | Caradot ...................... 24/134 N |
| 3,902,228 | A | * | 9/1975 | Caradot ...................... 24/134 N |
| 3,923,333 | A | * | 12/1975 | Whaley ........................ 294/104 |
| 3,948,362 | A | | 4/1976 | Greest |
| 4,483,517 | A | * | 11/1984 | Cavalieri ...................... 254/254 |
| 4,569,507 | A | * | 2/1986 | Robert .......................... 254/246 |
| 4,923,153 | A | | 5/1990 | Matsui et al. |
| 2010/0218348 | A1 | | 9/2010 | Mamie |

FOREIGN PATENT DOCUMENTS

| | | |
|---|---|---|
| DE | 81 31 815 | 2/1982 |
| DE | 30 38 418 | 7/1982 |
| DE | 84 37 581 | 9/1986 |
| DE | 89 01 065 | 4/1989 |
| DE | 10 2007 045 170 | 4/2009 |
| FR | 2 293 950 | 7/1976 |
| WO | WO 83/01433 | 4/1983 |

OTHER PUBLICATIONS

English Translation of International Preliminary Report on Patentability and Written Opinion of the International Searching Authority in PCT/DE2010/075146, dated Jun. 5, 2012.

* cited by examiner

DEVICE FOR FASTENING AND CLAMPING STRAPS

CROSS REFERENCE TO RELATED APPLICATIONS

This application is the National Stage of PCT/DE2010/075146 filed on Nov. 30, 2010, which claims priority under 35 U.S.C. §119 of German Application No. 10 2009 044 739.3 filed on Dec. 2, 2009, the disclosure of which is incorporated by reference. The international application under PCT article 21(2) was not published in English.

The invention relates to a device for fastening and clamping straps.

Straps (also known as tie-downs) are used in many areas, in particular for tying down goods to be transported.

Long straps and tubular webbing with widths of 25, 30, 35 or 50 mm are also used for the sport referred to as slacklining, which involves balancing on a strap strung between two anchors. The strap is fastened at one end with a screw-lock carabiner or schackle. At the other end, either a pulley system of the type known from Alpine sport, a strap ratchet or a hoist is used to tension the strap. Since longlines, as they are called, some of which are slung over distances of several hundred meters, and highlines, which are slung at heights ranging from a few meters to several hundred meters, sometimes have to be prestressed with more than 15 kN to make them walkable, the clamping devices must have high breaking strengths. Many conventional clamping devices are not designed to take up such high forces. Moreover, they also damage the strap and may cause it to fail. An additional problem is that it may be necessary to remove the clamping device from the strap or attach it to an already tensioned strap. This is impossible with the known clamping devices.

The DE 1 773 606 U1 describes a self-locking parallel clamp for tensioning wires. The clamp features two symmetrical knee levers and has a spring fitted above a guide rod, between the tensioning element and the transverse member with the clamping jaws.

The DE 30 38 418 A1 describes a wire-rope or cable clamp having a pair of mutually parallel, wedge-shaped clamping jaws that are fitted slidably in a housing and that, when indicated, are pressed against the wire rope or cable via spring loading. An excenter that acts on at least one of the jaws is provided for releasing the jaws from the clamping position.

From the DE 81 31 815 U1, a parallel clamp for overhead telecommunication lines is known in which the line to be clamped, which may consist of a naked wire, is clamped between two clamping jaws that move toward each other during the clamping process. It is explained there that, with a parallel clamp of this kind, arbitrary lengths of wire or cable are easily unclamped, but that it is not possible to apply arbitrary tensile forces to the unclamped cable or wire because otherwise the wire or cable will slide between the parallel clamps.

The DE 89 01 065 U1 describes a device for securely anchoring a belt- or strip-shaped material, such as a flat cable, to a mounting surface, wherein the belt- or strip-shaped material is clamped in the interior of the hinge-like device.

The DE 10 2007 045 170 A1, ultimately, decribes a clamping lock for a tensioning means, wherein a stop web and a pivot spindle for a comb element are arranged in a housing.

The object of this invention is to create a device for fastening and clamping straps that also permanently withstands high mechanical loads and does not cause damage to the strap.

This object is established according to the invention by providing at least one pair of pivoting levers, wherein two mutually parallel clamping plates with flat clamping surfaces are hinged between the pivoting levers, the width of the clamping surfaces corresponding at least to the width of the strap and the clamping plates being provided with means for securing the strap in the clamped state.

The pivoting levers are fastened to a tensioning device, for example a chain hoist, on actuation of which the pivoting levers absorb the tension and transmit it to the clamping plates so that the clamping surfaces of the clamping plates are pressed against each other and the strap fitted between the clamping surfaces is securely clamped.

A device of this kind, which also withstands the high mechanical loads occurring, for example, during the tensioning of very long slacklines, known as longlines, may be used to securely clamp a strap. The greater the tension, the more securely the strap is clamped. The device of the invention does not damage the strap even when it is clamped repeatedly. A further advantage of the device is its ease of use.

A refinement of the invention consists in the provision of a tractive member to which the pivoting levers are hinged.

In this embodiment, the tractive member is fastened to the tensioning device and then transmits the tension to the pivoting levers, simultaneously preventing the device from tilting rearward when under load.

According to the invention, a fastening means which facilitates the fastening of a tensioning device to the device of the invention is provided on one of the pivoting levers or on the tractive member.

It is within the scope of the invention that the fastening means is configured as a hook, an eye, a thread or a rope pulley.

A refinement of the invention consists in the provision of a pair of pivoting levers on each side of the clamping plates.

The mechanical loading capacity of the device is hereby increased because tension can be transmitted more effectively to the clamping plates by the pivoting levers.

A preferred embodiment of the invention consists in that the means for securing the strap in the clamped state is configured as a clamping-plate coating made of a material softer than the strap, for example rubber or plastic.

The strap is hereby prevented from slipping out from between the clamping plates.

The invention includes the provision of means for removing the device from the tensioned strap and/or for attaching the device to an already-tensioned strap.

As mentioned above, it may be necessary to remove the clamping device from the tensioned strap or to attach it to an already tensioned strap. This may be done, for example, by detaching one of the clamping plates or a pair of pivoting levers, or a combination thereof.

In this connection, according to the invention, the means for removing the device from the tensioned strap or for attaching the device to an already-tensioned strap is configured as a releasable fastener for one of the clamping plates or a pair of pivoting levers.

A detachable clamping plate may be fastened to the pivoting levers by way of wing nuts, for example, which can be removed in order to detach the clamping plate. This form of fastening means is also possible for a detachable pair of pivoting levers.

Alternatively, or in combination, the invention also provides for the means for detaching one of the clamping plates or for detaching the pivoting levers to be configured as slots in the pivoting levers, said slots being open at one end and serving to hinge the pivoting levers to the clamping plates.

This makes it possible to detach the clamping plate simply by swinging the pivoting levers rearward, without having to undo any screwed connections.

A preferred embodiment of the invention consists in that the distance between the fastening means provided on one of the pivoting levers, or between the hinge on the tractive member, and the hinge on the nearer of the two clamping plates is greater than the distance between the hinges on the two clamping plates.

The transmission ratio is determined by the choice of distance between the hinges. A transmission ratio of 1 to 1.5 has proved optimal.

Embodiments of the invention are explained below by reference to drawings.

Figure 1:
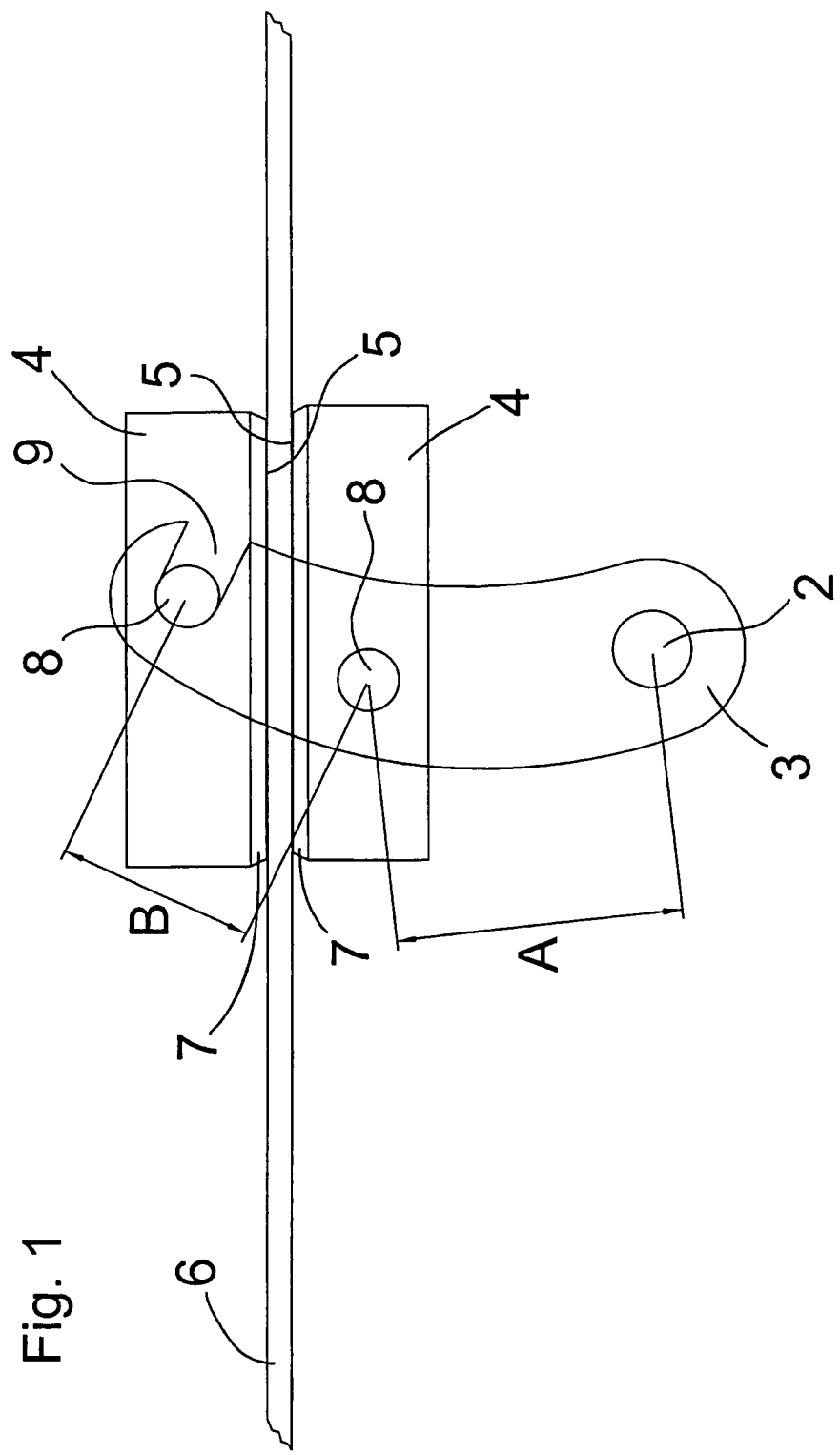
FIG. 1 shows a side view of a first inventive device for fastening and clamping straps.

The device according to FIG. 1 has at least one pair of mutually parallel pivoting levers 3. Two mutually parallel clamping plates 4 with flat clamping surfaces 5 are hinged between the pivoting levers 3. Preferably, a pair of pivoting levers 3 is fitted on either side of the clamping plates 4 in order to ensure even load transfer.

The clamping surfaces 5 are at least as wide as the strap 6 to be clamped. To secure the strap 6 in the clamped state, the clamping plates 4 are provided with means 7 that are configured as a coating 7 typically made of rubber or plastic and forming the clamping surfaces 5.

At the free ends of a pair of pivoting levers 3 a fastening device 2 is provided for attaching a tensioning device to the device of the invention. The fastening means 2 is configured as a crossbolt between the free ends of the pair of pivoting levers or as an eye 2 at one end of the tractive member 1. Other alternatives include a hook, an interior thread, a stud bolt or a rope pulley. The fastening means 2 serves for fastening the device of the invention to a chain hoist, for example, or, when the means 2 is configured as a movable pulley, for integrating it in a pulley system.

If tension is exerted on the fastening device via the fastening means 2, the pivoting levers 3 are deflected and the clamping surfaces 5 of the clamping plates 4 are pressed together, whereby the strap 6 is firmly clamped in the device and the tension is transmitted to the strap 6.

In addition, a means 9 is provided for removing the device from the tensioned strap 6 or for attaching the device to an already-tensioned strap 6. The means 9 may be configured as a releasable fastener for the upper clamping plate 4 and extends through the pivoting lever 3 and the upper clamping plate 4. Whereas the lower clamping plate 4 is riveted to the pivoting levers 3 or is joined thereto by means of a permanent screwed connection, the upper clamping plate 4 may have wing nuts, for example, which enable the fastener connecting the pivoting levers 3 with the clamping plate 4 to be removed. Especially in combination with a releasable screwed connection for the clamping plates 4, the means for detaching one of the clamping plates 4 may be configured as oblique slots 9, which are open at one end, in the pivoting levers 3. This arrangement makes it unnecessary to remove fastening elements because the upper clamping plate 4, which in this case is hinged 8 by means of bolts, can be detached by swinging the pivoting levers forward. By analogy, it is also possible to configure a pair of pivoting levers 3 in such manner as to be releasable, thus enabling the device to be removed from the tensioned strap 6 or to attach the device to an already-tensioned strap 6.

It is also evident from FIG. 1 that the distance A between the fastening means 2 and the hinge 8 on the nearer clamping plate 4 is greater than the distance B between the hinges 8 on the two clamping plates 4 (A is preferably 1 to 1.5 times greater than B). This distance defines the transmission ratio of the device.

Figure 2:
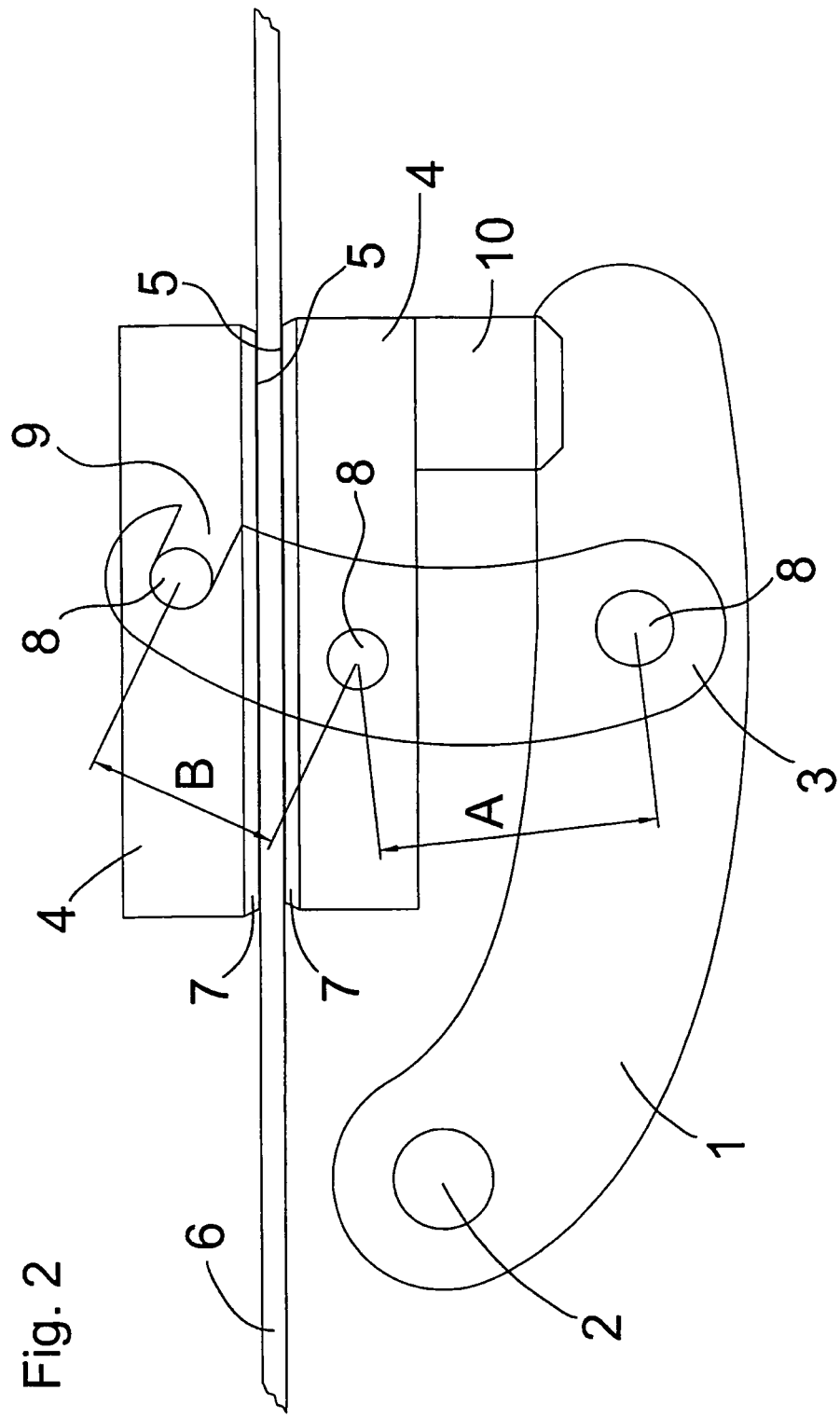
FIG. 2 shows a side view of a second inventive device for fastening and clamping straps.

FIG. 2 shows a refinement of this device. Identical parts are provided with the same reference numerals as in FIG. 1. The device of FIG. 2 has a tractive member 1 configured, by way of example, as a bent metal part, at the free end of which the fastening means 2 is located. The pivoting levers 3 are hinged to this tractive member 1. To prevent the device from tilting rearward when under load, a support surface of a tilt-prevention arm 10 is attached which transmits the tilt moment of the clamping plates 4 to the tractive member 1, thereby reducing the moment.

It is also evident from FIG. 2 that the distance A between the hinge 8 on the tractive member 1 and the hinge 8 on the nearer of the clamping plates 4 is greater than the distance B between the hinges 8 on the two clamping plates 4 (A is preferably 1 to 1.5 times greater than B). This distance defines the transmission ratio of the device.

Figure 3:
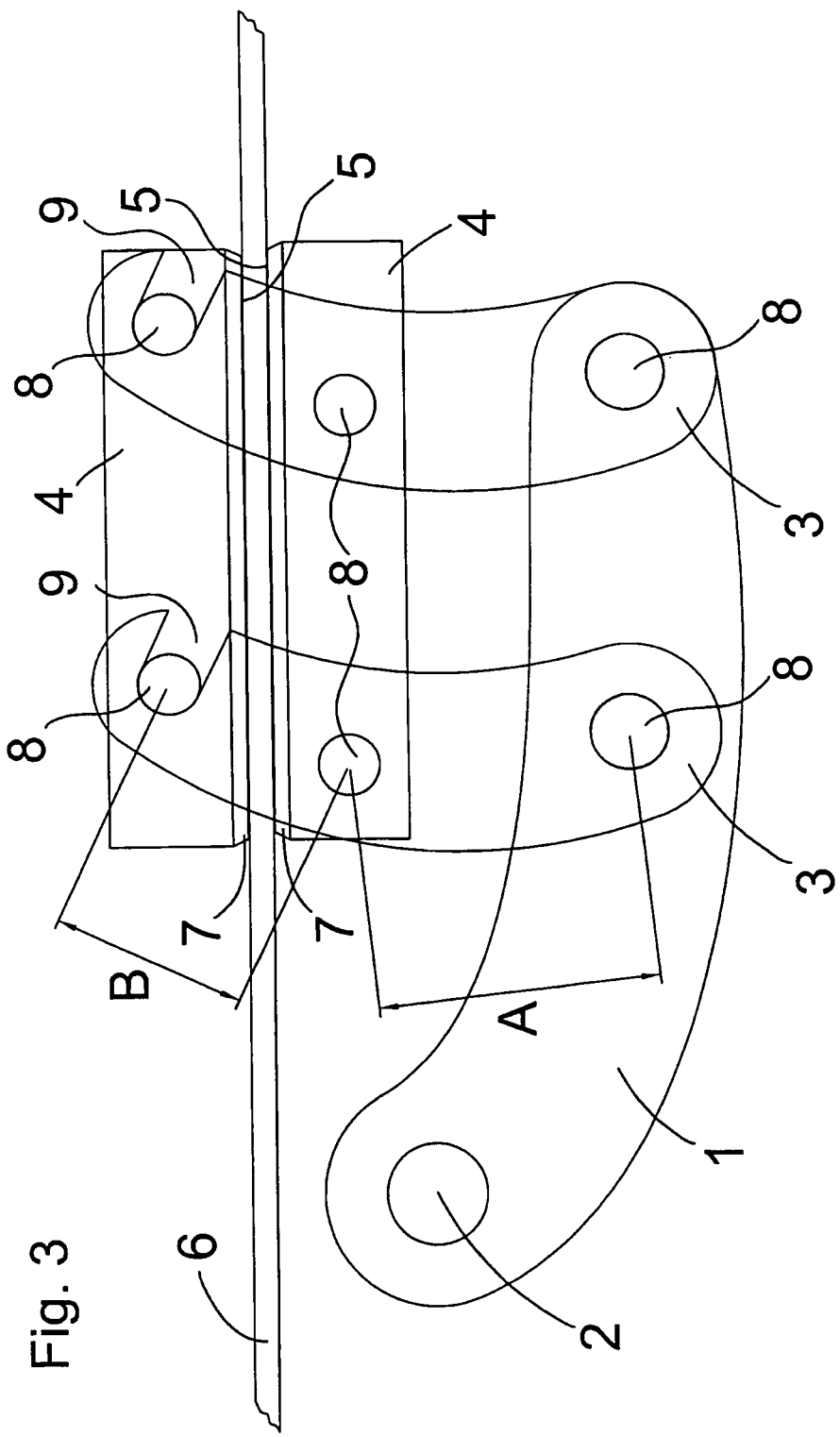
FIG. 3 shows a side view of a third inventive device for fastening and clamping straps.

The embodiments of FIGS. 2 and 3 correspond otherwise to the embodiment of FIG. 1.

Figure 4:
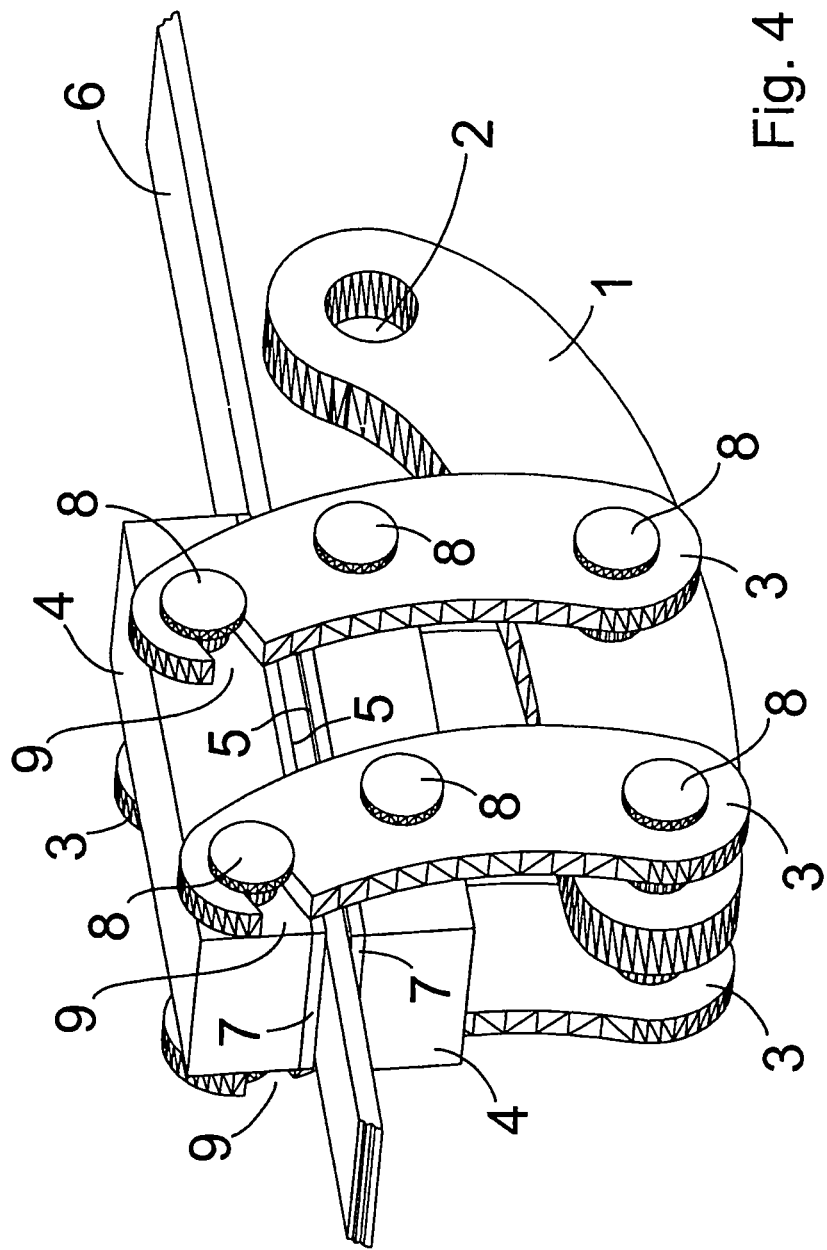
FIG. 4 shows a perspective view of the device shown in FIG. 3.

FIGS. 3 and 4 show a refinement of this device. Identical parts are provided with the same reference numerals as in FIG. 1. The device of FIGS. 3 and 4 has a tractive member 1 configured, by way of example, as a bent metal part at the free end of which the fastening means 2 is located. Two pairs of pivoting levers 3 are hinged to this tractive member 1.

It is also evident from FIG. 3 that the distance A between the hinge 8 on the tractive member 1 and the hinge 8 on the nearer of the clamping plates 4 is greater than the distance B between the hinges 8 on the two clamping plates 4 (A is preferably 1 to 1.5 times greater than B). This distance defines the transmission ratio of the device.

The embodiments of FIGS. 3 and 4 correspond otherwise to the embodiment of FIG. 1.

LIST OF REFERENCE NUMERALS

1 Tractive member
2 Fastening means
3 Pivoting lever
4 Clamping plate
5 Clamping surface
6 Strap
7 Securing means
8 Hinge
9 Slots
10 Support surface of a tilt-prevention arm

The invention claimed is:

1. A device for fastening, clamping, and tensioning a flat strap, the device comprising a first pair of angled pivoting levers and two mutually parallel clamping plates with flat clamping surfaces, the clamping plates being hinged between the first pair of angled pivoting levers, said clamping surfaces being at least as wide as the flat strap and being provided with securing devices for securing the flat strap in a clamped state, the device comprising a removing and attaching device for removing the device from the flat strap in a tensioned state and/or for attaching the device to an already-tensioned flat strap, the removing and attaching device being configured as slots in the angled pivoting levers, said slots being open at one end in the clamped state and serving to hinge the pivoting levers to the clamping plate, further comprising a tractive member to which the pivoting levers are hinged, and further comprising a tilt-prevention arm extending perpendicularly from a first clamping plate of the two mutually parallel clamping plates and configured to transmit an tilt movement of the clamping plates to the tractive member.

\* \* \* \* \*